United States Patent [19]

Zeman

[11] Patent Number: 5,224,796
[45] Date of Patent: Jul. 6, 1993

[54] FLAT SIDED IRRIGATION TUBING

[76] Inventor: David Zeman, P.O. Box 42040, Las Vegas, Nev. 89116

[21] Appl. No.: 919,751

[22] Filed: Jul. 27, 1992

Related U.S. Application Data

[62] Division of Ser. No. 409,005, Sep. 9, 1989, Pat. No. 5,141,360.

[51] Int. Cl.⁵ .............................. E02B 13/00
[52] U.S. Cl. .................................. 405/43; 138/115; 405/45; 405/36
[58] Field of Search ................ 405/43, 45, 48; 138/119, 120, 121; 239/547, 542

[56] References Cited

U.S. PATENT DOCUMENTS

| | | | |
|---|---|---|---|
| 986,940 | 3/1911 | Osborne | 405/43 |
| 3,508,587 | 4/1970 | Mauch | 138/119 |
| 3,648,895 | 3/1972 | Strazdins | 138/119 X |
| 4,246,936 | 1/1981 | Luz | 405/43 X |
| 4,254,916 | 3/1981 | Havens et al. | 239/547 |

Primary Examiner—Dennis L. Taylor

[57] ABSTRACT

An irrigation tube having a polymer peripheral wall can be constructed so that the peripheral wall is composed of an even number greater than 2 of substantially rigid panels connected at their side edges by the same number of line like flexible areas. Water flow from such a tube can be regulated through the use of holes in such panels of various different shapes. Because of the use of such panels and line like areas the tube can be easily collapsed to a lay flat configuration in which it can be easily coiled, stored and handled until it is used and can be easily expanded to a normal configuration when it is used.

23 Claims, 2 Drawing Sheets 5,224,796

FLAT SIDED IRRIGATION TUBING

CROSS REFERENCE TO RELATED APPLICATION

This application is a division of application Ser. No. 07/409,005 filed by Applicant herein on Sep. 9, 1989 entitled "Irrigation Tubing", now U.S. Pat. No. 5,141,360. The entire disclosure of this parent application is incorporated herein by reference for the purpose of amplifying the disclosure of this specification.

BACKGROUND OF THE INVENTION

The invention set forth and claimed in this specification pertains to new and improved tubing such as is preferably used for irrigation purposes which will lay flat when coiled and which will automatically expand to a normal configuration as it is used.

Although a number of different types of tubing are currently used for irrigation purposes it is believed that the vast majority of such tubing is common seamless cylindrical tubing formed by extruding an organic polymer or polymer mixture which is flexible when present in a comparatively thin panel or wall but which is substantially inflexible when present in a wall or panel of significantly greater thickness. Such tubing is comparatively inexpensive and can be formed of a composition which is relatively immune to deterioration under normal conditions of use in a field or the like. Many of such polymer compositions are of such a character that comparatively limited amounts of polymer material are required in a tube which can be used with water or other liquid at a moderately high pressure without significant danger of the tube rupturing.

Even though such cylindrical tubing is advantageous for irrigation and other uses it is considered to be less desirable than desired from an economic standpoint because the shape of the tubing effectively precludes it from being coiled and otherwise handled as easily flat, bendable ribbons or strips of various materials can be coiled and handled. This is best illustrated by discussing two different types of such cylindrical tubing—formed out of a material which is of a limited flexibility and tubing formed of a material which is relatively flexible.

Cylindrical tubes formed of a material having such limited flexibility frequently do not collapse to a relatively flat configuration or can only be collapsed to such a configuration with difficulty. It is well recognized that it is frequently difficult or impossible to wind such tubing into a "tight" coil having a relatively small diameter. It is also commonly known that when such relatively inflexible tubing is wound onto a coil that the coil contains a great deal of air because the tubing in it is not flat or relatively flat but is essentially "open". As a consequence of this it takes more space to store coils of relatively inflexible tubing than may be desirable.

As opposed to this comparatively flexible thin walled tubing can be flattened so as to be more easily coiled into a comparatively "tight" coil of a relatively small diameter. Unfortunately there is a significant possibility of such tubing being damaged if it is improperly manipulated as it is flattened or if it is formed of a material of lesser flexibility than necessary to withstand a flattening operation. Also it is unfortunate that the amount to which such tubing can be flattened is limited by the fact that the edges of the flattened tubing normally will be shaped more or less like loops and will contain small internal spaces paralleling such edges. Efforts to remove these edge "loops" by the use or pressure on the tubing are considered to be undesirable because of the possibility of damaging the tubing walls adjacent to such loops.

As a result of these and other considerations it is believed that there is a need in at least the irrigation or plat watering fields for new and improved tubes or tubing which are capable of being flattened for coiling and storage purposes and which are capable of being expanded to a normal cross-sectional configuration without any loss of intended physical properties. This latter is considered important. Many of the polymers and polymer compositions useful in forming tubing are of such flexibility that they can only be bent or flexed to a limited extent without the danger of damage.

BRIEF SUMMARY OF THE INVENTION

It is believed that it will be apparent from the preceding that an objective of the invention is to provide new and improved polymer tubing which is considered to be especially desirable for plant watering or irrigation purposes, because of the fact that such tubing can be handled and stored in an essentially flat configuration and because such tubing can normally be expanded from such a flat configuration without significant danger of damage. A further objective of the invention is to provide irrigation tubing containing holes having desirable flow characteristics.

More specifically an object of the invention is to provide tubing as indicated which is specifically designed so that it can be easily flattened without damage so that it can be easily handled as it is manipulated during manufacturing operations, coiling, installation and the like and so that it can be easily inflated or manipulated to an open or expanded configuration without damage to the tubing. During such manufacturing operations it may, in some cases, be more desirable to perform various different operations such as printing, drilling, striping with a root control or fertilizing material or even attaching a secondary flow control structure on "lay flat" tubing as indicated in the preceding discussion when such tubing is in a flat or collapsed configuration than when such tubing is in a an expanded or partially expanded configuration.

Another objective of the invention is to provide tubing of the type described which can be easily and conveniently manufactured, stored, processed as required for many applications and used at a comparatively nominal cost. This latter is quite important in connection with the field of the invention—the field of tubing as used for plant watering or drip or seep irrigation purposes—because even minor cost savings and advantages will mark the difference between commercial success and failure in this field.

The broadest of these various objectives are believed to be achieved in accordance with the invention by providing an elongated tube having a peripheral wall formed of a polymer which is flexible when present in a panel of one thickness but which is substantially inflexible when present in a corresponding panel having a greater thickness in which the improvement comprises: said peripheral wall consists of an even number of elongated, flat panels positioned so each edge on each panel is adjacent to an edge on another panel, each of said panels having parallel side edges, and an even number of line like areas of less thickness than said panels, each of said areas having a uniform width, each of said line like areas being sufficiently thin so as to be more flexible than said panels. each of said line like areas joining two adjacent edges of two of said panels. said areas being sufficiently flexible so as to permit said tube to automatically fold along said areas when coiled so as to be flat.

The discussion of the preceding paragraph is not to be considered as setting forth all of the advantageous features and aspects of the present invention. Those familiar with the field of the present invention will realize that preferred structures for various different utilities in accordance with the invention will have novel features which are not indicated in this preceding paragraph. Such features are best indicated in the following discussion of presently preferred structures in accordance with the invention.

BRIEF SUMMARY OF THE DRAWING

Because of the nature of the invention it is believed that it is best more fully described with reference to the accompanying drawings in which.

Figure 1:
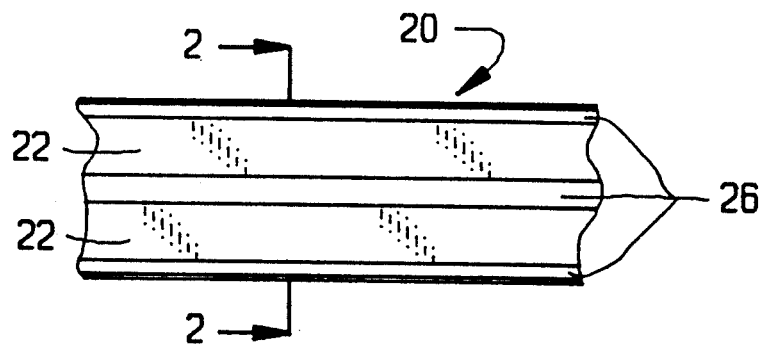
FIG. 1 is a side elevational view of a presently preferred embodiment of a tube in accordance with the invention in an expanded or normal configuration.

In the subsequent detailed description and in the drawings the same numbers are used in or in connection with the embodiments shown in various different figures to designate items which are the same or substantially the same in such figures in order to avoid having to separately describe such items in connection with each embodiment of the invention. Both in the drawings and in the subsequent discussion matters which are essentially matters of routine skill in the field of the invention have not been illustrated or described.

Neither has any effort been made to illustrate or describe all theoretically permutations and combinations and modification of the features of the invention which are within the skill of an ordinary worker in the field of the construction of tubing used for plant watering or irrigation purposes. For this reason the invention is to be considered as being limited solely by the accompanying claims forming a part of this specification and is not to be considered as being limited to items which appear precisely as illustrated in the drawings.

DETAILED DESCRIPTION OF THE PREFERRED EMBODIMENTS

In the initial figures of the drawing there is shown a presently preferred tube 20 in accordance with the invention which has been formed by conventional extrusion techniques out of an organic polymer or polymer composition which is impervious to water and which is flexible when present in a panel or wall which is comparatively thin but which is substantially inflexible when present in a panel or wall which has a greater thickness. Suitable polymer compositions having such characteristics are currently used in the manufacture of comparatively flexible cylindrical irrigation tubing. Since such compositions are well known it is not considered necessary to specify suitable compositions in this specification.

Figure 2:
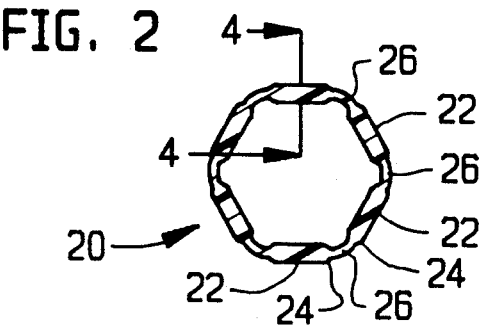
FIG. 2 is a cross-sectional view taken at line 2—2 of FIG. 1.
Figure 3:
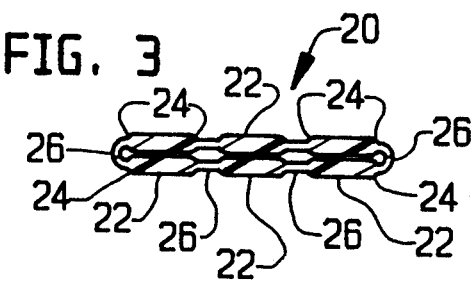
FIG. 3 is a cross-sectional view corresponding to FIG. 2 in which the tube is shown in a collapsed or lay flat configuration.

This tube 20 is preferably extruded so as to be a continuous, one piece structure having an even number of identical wall panels 22 joined at their adjacent parallel side edges 24 by the same number of identical line like areas 26. The panels 22 are flat and are sufficiently thick so that they will remain substantially flat when the tube 20 is used with a fluid—normally water—within this tube 20 at no higher than a rated or intended working pressure. The areas 26 differ in that they are sufficiently thin and flexible so as to be capable of being flexed to permit the tube 20 to be manipulated between an open or expanded configuration as shown in FIGS. 1 and 2 and a collapsed or lay flat configuration as illustrated in FIG. 3. It will be noted that the areas 26 have what may be described as a "necked down" cross-sectional configuration.

Although an even number of the panels 22 and the areas 26 have to be used in order for the tube 20 to collapse to a lay flat position the number of the panels 22 and areas 26 is essentially a matter of choice. If this number is less than 6 in a tube 22 having a specific total cross-sectional area available to convey a liquid such as water the amount of polymer material in the tube 22 will be greater than if the tube was a 6 sided tube of the same area. While the amount of material in tubes having more than 6 panels and areas 26 and the same internal cross-sectional area will decrease as the number of sides increases concurrently the complexity and hence the cost of the extrusion die necessary to form the tube 22 will increase. For this reason it is considered that the use of a 6 sided tube 20 as shown is preferable for economic reasons.

It is also considered preferable to use a tube 20 in which the panels 22 are sufficiently thick so as to remain substantially flat when the pressure of a fluid—normally water—within the tube 22 does not exceed the intended or rated internal pressure within the tube 20. Normally this will be somewhat less than the pressure at which an area 26 in the tube 20 will rupture. This pressure will, of course, vary depending upon a number of factors. One such factor which is particularly significant will be the physical properties of the polymer or polymer composition used. Enough of such material should normally be used so that the tube 20 will not rupture under the intended conditions of use even after the initial properties of such material have deteriorated due to ambient influences.

The use of panels 22 which are flat is preferable for several reasons. It will be obvious that it is necessary in making a tube 20 which will fold so as to lie flat as illustrated in FIG. 3. When so collapsed the tube 20 can be easily handled, coiled and other wise manipulated when creating holes as subsequently described, in providing various layers as subsequently described and forming the tube 20 into relatively compact coils for storage and shipment. Because of the use of flat panels 22 a tube 22 can be engaged with guides or guide rollers and held so that it cannot twist as it is moved past a station where an operation is performed on the tube 22.

In connection with this it is noted that the tube 20 be easily deformed automatically using guides or guide rollers of the like so as to manipulate it between a flat, folded configuration and an expanded or open configuration. The engagement of a tube 22 with correspondingly shaped rollers or other guides as it is so manipulated and as other operations are performed on it so that it cannot twist during such manipulation or operations is considered important. Such manipulation or flexure of the tube 20 between these configurations shortly after it has been extruded is considered to be particularly desirable in that it tends to orient the polymer material in the areas 26. It is believed that this is advantageous in enabling the areas 26 to serve effectively as hinges.

Figure 8:
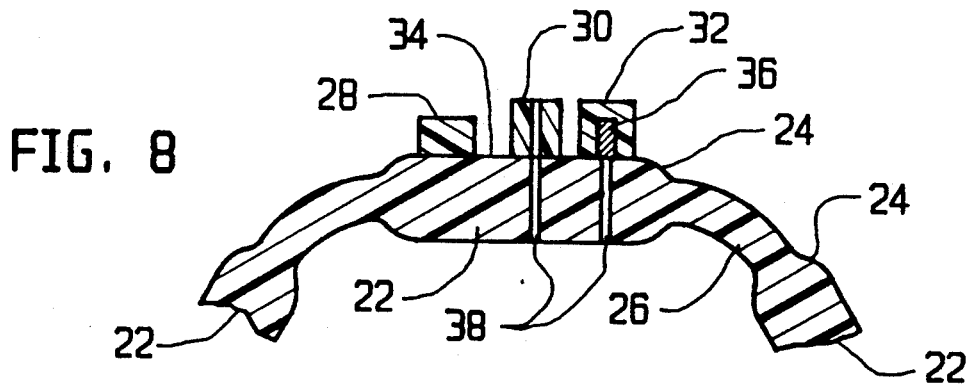
FIG. 8 is a partial cross-sectional view corresponding to FIG. 2 at an enlarged scale showing how various layers can be located on the exterior of a panel of the tube shown.
Figure 9:
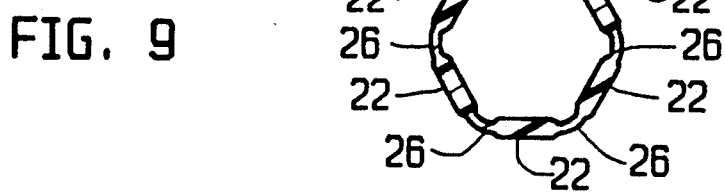
FIG. 9 is a cross-sectional view corresponding to FIG. 2 of a modified tube of the invention in which one wall panel of the tube is thicker than the other panels.

The desirability of such flat panels 22 is easily illustrated by referring to various layers 28, 30, 32 or other layers (not shown) which can be located on the surfaces 34 of such panels 22 with a minimum of difficulty and at a comparatively low cost as such panels are held against twisting. Normally only 1 or 2 of these layers 28, 30 and 32 will be used at the same time on a panel 22. The layer 28 shown in FIG. 8 is a conventional layer of printed indicia as may be desired in identifying the origin of the tube 20 or indicating its proper utilization.

The layer 30 is of a different category than the layer 28. It preferably consists of a strip of material (not separately numbered) which is either directly or indirectly significant in connection with the use of the tube 20. As an example of this the layer 30 on the tube 20 can be a mixture of a known hot melt adhesive and a root growth inhibitor in which the amount of the root growth inhibitor is sufficient to be effective in inhibiting root growth and is so limited as not to significantly detract from the physical properties of the adhesive. When such a composition is used the adhesive should be of such character as to bond the material within the tube 20. If desired an insecticide or fungicide can be substituted for or mixed with the root inhibitor in such a mixture.

Also, if desired an "active" composition such as a root growth inhibitor, a fungicide or an insecticide can be used without being mixed with an adhesive as a core or core strip 36 which is held in place by the layer 32 so as to be enclosed by this layer 32. In this case it is obvious that the layer 32 must be bonded to the surface 34 of the panel 22. For some applications it may be desirable for the layer to be porous or permeable to water so as to permit the material within the core strip 36 to be disseminated through it as the tube 20 is used.

However, it is normally preferred to intersect both the strip 36 and the layer 32 with a hole 38 leading through the panel 22 in which the strip 36 and layer 32 are located. A similar hole 38 can be used in connection with the layer 30 as shown or can even be used to extend through the layer 28. When such holes 38 are used with the layers 30 and 32 a liquid—normally water—within the tube 20 will contact the "active" material in the core strip 36 or in the layer 30 so as to convey some of such material in the area adjacent to the tube 20 where it can be active in inhibiting root growth, insect infestation, or the growth of fungus or the like.

The use of flat panels 22 is also advantageous for another reason. Because these surfaces are flat it will be relatively easy to tap into them and to mount various auxiliary devices upon them either before or after a tube 20 is installed in a desired location. Further, during installation the orientation of the tube 20 by a holder having an opening or notch correspond in shape to more than half way around the periphery of the tube 20.

So that the tube 20 can be used to distribute water or other fluid over an extended area it is preferred that the holes 38 indicated in the preceding (regardless of whether or not they go through any layers) be a part of a series of such holes 38 located along the length of the tube 20. If such liquid is to be dispensed substantially equally along such a length the holes 38 in such a series should be relatively close together and should be equally spaced in accordance with conventional practice. However, it is also possible to vary the spacing of such holes 38 in accordance with the anticipated distances between plants to be watered with a tube 20.

The particular holes 38 illustrated in FIG. 8 are intended to be normal cylindrical or essentially cylindrical holes extending perpendicular to the surface 34 of the panel 22 shown in this figure. It is considered that such a hole offers a minimum resistance to fluid flow from the interior of a tube 22. Normally it is considered to be desirable to make the diameter of such a hole 38 as small as possible so as to limit the flow through it as much as reasonably possible. Unfortunately there is a practical limit to the amount to which the diameter of a hole can be reduced if the hole is to be formed economically as with the use of a laser in accordance with known practice.

Figure 4:
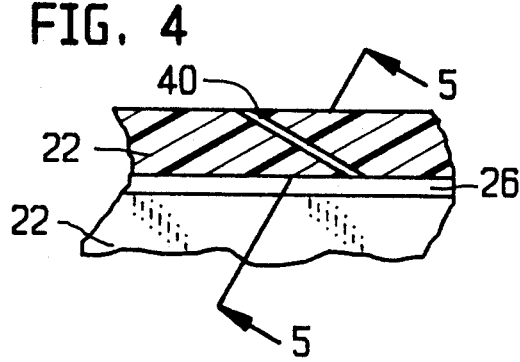
FIG. 4 is a partial cross-sectional view taken at line 4—4 of FIG. 2 at an enlarged scale showing one of a series of spaced holes used in a panel of the tubing illustrated.

For this reason it is preferred to use various expedients as herein described so that the manner in which a hole 38 is formed serves to limit the flow through the hole. One such expedient is to slant a small hole 40 as illustrated in FIG. 4 which is so limited in dimension that the adjacent or opposite boundary layers formed by flow through it will significantly impede or restrict such flow. While this expedient can be used with a hole of any cross-sectional configuration since it utilizes a boundary layer is normally formed between a liquid and a surface it is employed in accordance with the invention to retard flow by increasing the length of the internal surface along which a boundary layer is formed as much as possible. This slanting increases the resistance to flow in a hole provided by boundary layers over that achieved when a corresponding hole 38 goes directly through a panel 22 by the shortest path possible.

For the resistance to flow of a boundary layer within a hole such as the hole 38 to be as effective as possible the dimensions of a round hole must be sufficiently small so that the effect of the boundary layer on one part of the hole will interact with the boundary layer on at least one other part of the hole in impeding flow. In accordance with the present invention it has been recognized that if the maximum benefit of boundary layers in impeding flow is to be achieved that the distance between surfaces in a hole should be sufficiently small so that there is not only no or substantially no laminar flow between such surfaces and should be so limited that apparently there is no turbulent flow or, at most, very limited turbulent flow adjacent to the barrier layers which form on such surfaces.

It is considered to be well established that the thickness of the barrier layer which will form along a polymer surface as water or other fluid flows along such a surface and of the corresponding region of turbulent flow on such barrier layer will vary in accordance with a multiplicity of factors which are beyond the scope of the invention. As a practical matter the effectiveness of adjacent barrier layers in a hole in minimizing flow through the hole is maximized by limiting the diameter of a round hole and by forming a non-round hole so as to maximize its peripheral area while minimizing its cross-sectional area.

Figure 5:
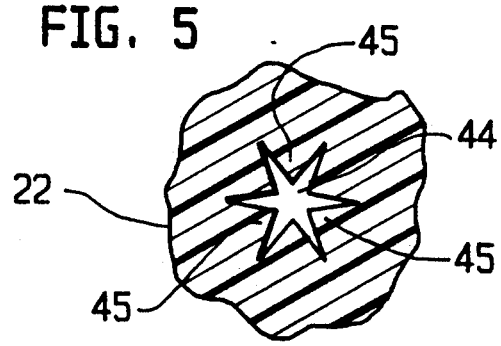
FIG. 5 is a partial cross-sectional view taken at line 5—5 of FIG. 4 showing the cross-sectional view of this hole.
Figure 6:
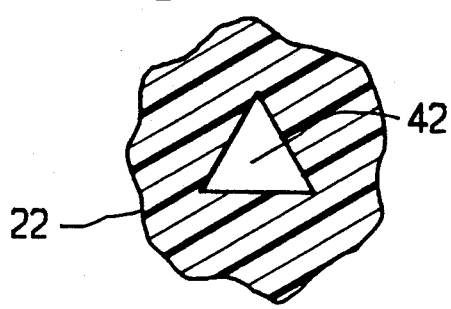
FIG. 6 is a view corresponding to FIG. 5 illustrating the cross-sectional configuration of a different hole which can be used instead of the hole shown in FIGS. 4 and 5.
Figure 7:
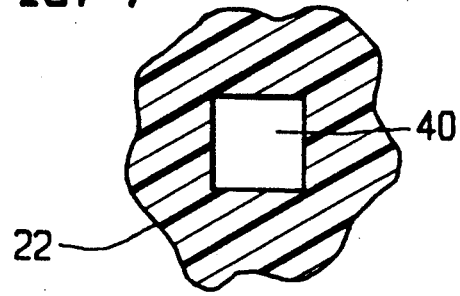
FIG. 7 is a view corresponding to FIG. 5 illustrating the cross-sectional configuration of an additional different hole which can be used instead of the hole shown in FIGS. 4.

As an example of this it is considered more desirable to make the hole 40 shown in FIG. 4 of a square cross-sectional configuration as shown in FIG. 7 than to make it of a cylindrical shape having the same cross-sectional area. A hole 42 which is shaped so as to have a uniform cross-sectional configuration of an equilateral triangle as shown in FIG. 6 may be used instead of a square hole. It is considered, however, that the boundary layer effect is best utilized in impeding flow through a hole 44 having a cross-sectional configuration corresponding to a star, preferably at least a 6 pointed star as shown in FIG. 5. The projections or fingers 45 within the hole 44 which define this star shaped configuration are preferably as thin as reasonably possible so as to be capable of flexing slightly to pass any small particle which may become stuck in the hole 44.

While holes such as the holes 40, 42 and 44 having "specialized" configurations can all be used in accordance with this invention so as to go perpendicularly through a panel 22 it is to be understood that normally greater resistance to fluid flow through them will be achieved by slanting them as indicated in FIG. 5. Such slanting may or may not be desirable in limiting flow from the tube 22 depending upon the direction in which a fluid will move through the interior of the tube 20. This latter has been know since Roman times. The angle between the axis of a slanted hole and the center of a tube 20 is, as a practical matter, limited by the ability to drill or burn a hole in a panel 22.

Figure 10:
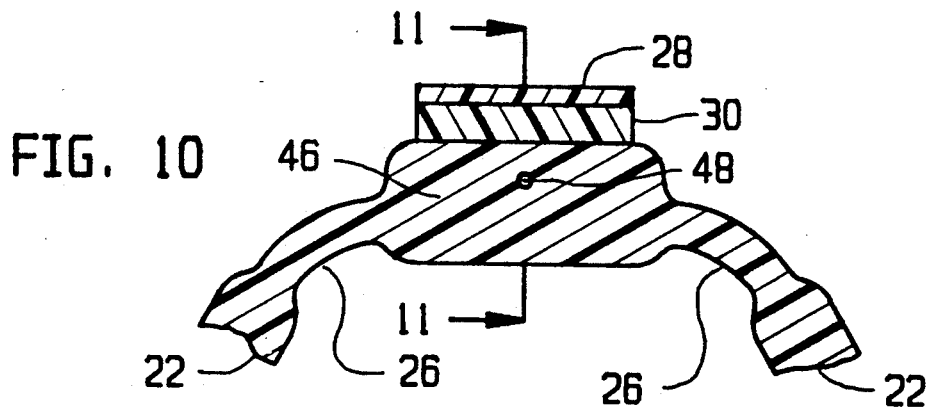
FIG. 10 is a partial cross-sectional view corresponding to FIG. 8 at an enlarged scale showing how various layers can be located on the exterior of the thick panel of the tube shown.
Figure 11:
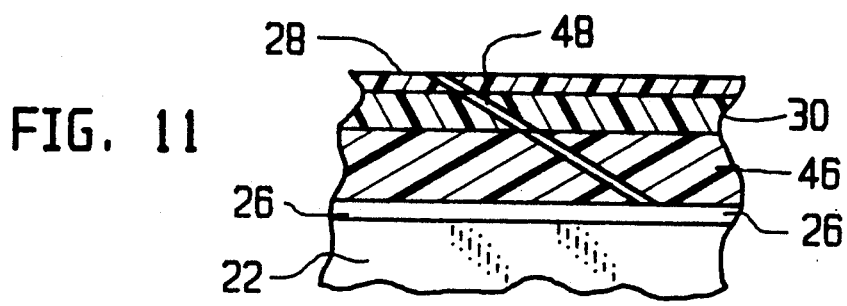
FIG. 11 is a partial cross-sectional view taken at line 11—11 of FIG. 10 showing how a hole through a tube panel can extend not only through such an enlarged panel but in addition through one of such layers.

On occasion a slanted hole in a panel 22 may not provide a desired resistance to flow because of the fact that the length of the hole is inadequate for the boundary layer which forms in it during use to provide a desired resistance to flow. This problem can be remedied without materially increasing the cost of the material within a tube 20 by substituting for a panel 22 in a tube 20 a panel 46 which is significantly thicker than the panel 22 as indicated in FIGS. 10 and 11. Such a panel 46 can be but need not be used with a layer 30 as previously described and a hole 48 of any of the cross-sectional configurations discussed in the preceding. The thickness of the panel 46, the angle of the hole 48 relative to the panel 46 and the shape and dimensions of the hole should all be coordinated so as to achieve a desired flow through the hole 48 under the expected conditions of use.

This discussion of the use of the shape and dimensions to control or restrict the flow through a hole is more fully discussed in the copending U.S. patent application Ser. No. 07/919,750, filed Jul. 27, 1992 entitled "Irrigation Tubing With Improved Discharge Holes". The entire disclosure of this other application is incorporated herein by reference.

I claim:

1. An elongated pressure irrigation tube having a peripheral wall formed of a polymer which is flexible when present in an area of one thickness but which is substantially inflexible when present in a corresponding area having a greater thickness in which the improvement comprises:

said peripheral wall consists of a plurality of elongated flat panels positioned so each edge on each panel is adjacent to an edge on another panel, each of said panels having parallel side edges, and an equal number of line-like areas of less thickness than said panels, each of said line-like areas being sufficiently thin so as to be more flexible than said panels, each of said line-like areas joining two adjacent edges of two of said panels, said panels being of such width and said line-like areas being sufficiently flexible so as to permit said tube to automatically fold along said line-like areas so that opposite panels lie substantially against each other so that said tube lies substantially flat and is sufficiently flexible so that said tube can be coiled when flat; and a plurality of irrigation water outlet holes through one of said panels along the length thereof.

2. An elongated pressure irrigation tube as claimed in claim 1 wherein:

said wall has an even number of said panels and the same number of said line like areas.

3. An elongated pressure irrigation tube as claimed in claim 1 wherein:

said panels are sufficiently thick so as remain substantially flat when a fluid at the rated usage pressure of said tube is present within the interior of said tube.

4. An elongated pressure irrigation tube as claimed in claim 1 wherein:

one of said panels is thicker than the other of said panels, said irrigation water outlet holes being through said thicker panel and being of such a character that the flow of water through said holes is limited by the presence of the boundary of such water along the interior of said holes.

5. An elongated pressure irrigation tube as claimed in claim 1 wherein:

said wall has at least 6 of said panels and the same number of said line like areas and said panels are sufficiently thick so as remain substantially flat when a fluid at the rated usage pressure of said tube is present within the interior of said tube.

6. An elongated pressure irrigation tube as claimed in claim 1 wherein:

said wall has 6 of said panels and the same number of said line like areas, all of said panels are identical and all of said line like areas are identical, and said panels are sufficiently thick so as to remain substantially flat when a fluid at the rated usage pressure of said tube is present within the interior of said tube.

7. An elongated pressure irrigation tube as claimed in claim 1 wherein:
all of said holes have a diamond shaped cross-sectional configuration.

8. An elongated pressure irrigation tube as claimed in claim 1 wherein:
all of said holes have a triangular cross-sectional configuration.

9. An elongated pressure irrigation tube as claimed in claim 1 wherein all of said holes have a star shaped cross-sectional configuration defined by walls intersecting each other at points.

10. An elongated pressure irrigation tube as claimed in claim 1 wherein:
the length of each of said holes of said cross-sectional configuration is sufficiently short so that the points of the star shape of said holes can flex to accommodate the passage of a particle through said holes.

11. An elongated pressure irrigation tube as claimed in claim 1 wherein:
said wall has at least 6 of said panels and the same number of said line like areas.

12. An elongated pressure irrigation tube as claimed in claim 1 wherein:
said panels are sufficiently thick so as remain substantially flat when a fluid at the rated usage pressure of said tube is present within the interior of said tube.

13. An elongated pressure irrigation tube having a peripheral wall formed of a polymer which is flexible when present in an area of one thickness but which is substantially inflexible when present in a corresponding area having a greater thickness in which the improvement comprises:
said peripheral wall consists of a plurality of elongated flat panels positioned so each edge on each panel is adjacent to an edge on another panel, each of said panels having parallel side edges, and an equal number of line-like areas of less thickness than said panels, each of said line-like areas being sufficiently thin so as to be more flexible than said panels, each of said line-like areas joining two adjacent edges of two of said panels, said panels being of such width and said line-like areas being sufficiently flexible so as to permit said tube to automatically fold along said line-like areas so that opposite panels lie substantially against each other so that said tube lies substantially flat and is sufficiently flexible so that said tube can be coiled when flat;
a plurality of irrigation water outlet holes through one of said panels along the length thereof; and
one of said panels being thicker than the other of said panels, all of said holes being located within said one of said panels, said one of said panels being sufficiently thick so that the holes through it are sufficiently long and of sufficiently limited cross-sectional dimension so that the flow of water through said holes during the use of said tube with water is limited by the presence of boundary layers of water along the interiors of said holes.

14. An elongated pressure irrigation tube as claimed in claim 13 wherein:
all of said holes are slanted relative to the thickness of said one of said panels and the length of said tube at an angle sufficient to influence the flow of water through said holes as said tube is used.

15. An elongated pressure irrigation tube as claimed in claim 14 wherein:
all of said holes have a diamond shaped cross-sectional configuration.

16. An elongated pressure irrigation tube as claimed in claim 14 wherein:
all of said holes have a triangular cross-sectional configuration.

17. An elongated pressure irrigation tube as claimed in claim 14 wherein all of said holes have a star shaped cross-sectional configuration defined by walls intersecting each other at points.

18. An elongated pressure irrigation tube as claimed in claim 17 wherein:
the length of each of said holes of said cross-sectional configuration is sufficiently short so that the points of the star shape of said holes can flex to accommodate the passage of a particle through said holes.

19. An elongated pressure irrigation tube having a peripheral wall formed of a polymer which is flexible when present in an area of one thickness but which is substantially inflexible when present in a corresponding area having a greater thickness in which the improvement comprises:
said peripheral wall consists of a plurality of elongated flat panels positioned so each edge on each panel is adjacent to an edge on another panel, each of said panels having parallel side edges, and an equal number of line-like areas of less thickness than said panels, each of said line-like areas being sufficiently thin so as to be more flexible than said panels, each of said line-like areas joining two adjacent edges of two of said panels, said panels being of such width and said line-like areas being sufficiently flexible so as to permit said tube to automatically fold along said line-like areas so that opposite panels lie substantially against each other so that said tube lies substantially flat and is sufficiently flexible so that said tube can be coiled when flat; and
a plurality of irrigation water outlet holes through one of said panels along the length thereof, said wall having six of said panels and the same number of said line-like areas, all of said panels being identical and all of said line-like areas being identical and said panels being sufficiently thick so as to remain substantially flat when a fluid at the rated usage pressure of said tube is present within the interior of said tube; and all of said holes being located through one of said panels, and are sufficiently long and of sufficiently limited cross-sectional dimension so that the flow of water through said holes during the use of said tube with water is limited by the presence of boundary layers of water along the interiors of said holes.

20. An elongated pressure irrigation tube as claimed in claim 19 wherein:
all of said holes have a diamond shaped cross-sectional configuration.

21. An elongated pressure irrigation tube as claimed in claim 19 wherein:
all of said holes have a triangular cross-sectional configuration.

22. An elongated pressure irrigation tube as claimed in claim 19 wherein all of said holes have a star shaped cross-sectional configuration.

23. An elongated pressure irrigation tube as claimed in claim 19 wherein:
the length of each of said holes of said cross-sectional configuration is sufficiently short so that the points of the star shape of said holes can flex to accommodate the passage of a particle through said holes.

* * * * *